350-167
CROSS REFERENCE SEARCH ROO
178
5.4

Jan. 17, 1967 L. GIL DE GIBAJA 3,299,203

COLOR TELEVISION DISPLAY MEANS INCLUDING A MULTIPLICITY OF LIGHT VALVES

Filed Aug. 27, 1964 2 Sheets-Sheet 1

Leonidas Gil de Gibaja

INVENTOR.

BY Jacobi & Davidson

Leonidas
Gil de Gibaja
INVENTOR.

BY Jacobi & Davidson

ATTORNEYS

United States Patent Office 3,299,203
Patented Jan. 17, 1967

3,299,203

COLOR TELEVISION DISPLAY MEANS INCLUDING A MULTIPLICITY OF LIGHT VALUES

Leonidas Gil de Gibaja, 19—19 21st Drive, Woolsey, Long Island, N.Y. 11105

Filed Aug. 27, 1964, Ser. No. 392,384
13 Claims. (Cl. 178—5.4)

The present invention relates generally to color television receivers and, more particularly, to a receiver in which the face of a single gun cathode ray tube is covered by a multiplicity of polarizing and color filtering mediums as well as an electro-optical filter that together convert monochromatic light from the cathode ray tube face into a color image.

Briefly, a preferred embodiment of the present invention comprises a system for converting a monochromatic television receiver into a color receiver. An electronic system is included for intensity modulating the cathode ray beam sequentially in accordance with red, green and blue chrominance information. A complete sequence of the red, green and blue intensity modulation takes approximately 0.1 microsecond, the time it takes the cathode ray beam to move completely from one area to the immediately adjacent area on the cathode ray tube face.

On the face of the single gun cathode ray tube is provided a mask for converting the black and white image into a color image. The mask comprises a stacked arrangement of polarizing and electro-optical sheets. A first polarizing sheet includes a multiplicity of adjoining segments, each of which is divided into three portions. Each of the three portions is a different polarizer for passing light polarized in three different directions.

The polarized light deriving from the first sheet is selectively coupled through an electro-optical filter that is activated to be a uniaxial crystal in each of the three directions. The electro-optical filter is switched between polarizing directions at the same rate as the red, green and blue chrominance information is sequenced to control the cathode ray beam intensity, i.e. $\frac{1}{30}$ microsecond. In consequence, the light intensity deriving from any spot on the electro-optical filter is indicative of chrominance and luminance of the particular color supplied to the electro-optical filter.

To convert the monochromatic light deriving from the electro-optical filter into a color image, a second polarizing sheet is provided. The first and second sheets have aligned, identically directed polarizing portions. The second sheet differs from the first, however, in that the three polarizing portions of each segment are provided with filters for passing red, green and blue light. In consequence, the light deriving from the second polarizing sheet is sequentially red, green and blue for each separate position of the swept cathode ray beam.

Because the beam must be continuously swept and one color is derived from only a segment of the total beam area at any time, a multiplicity of lenses are provided to be responsive to the light deriving from the second polarizing sheet. These lenses, one being provided in alignment with each of the polarizing segments, successively collect the gated red, green and blue light deriving from each trio of polarizing segments and display it on the same area. The eye mixes the successively derived colors to form the various color hues.

Because the mask of the present invention can be readily attached to the face of any existing monochromatic television receiver, the system is ideally suited as an adapter for converting black and white receivers into color receivers.

A further feature of the invention resides in its ability to be used, as is, for monochromatic reception. This is accomplished by quenching excitation of the electro-optical filter so that red, green and blue light is constantly focused on and derived from the lens array with equal intensity. As is well known, equal simultaneous mixing of red, green and blue results in derivation of a black and white image.

It is, accordingly, an object of the present invention to provide a new and improved color television receiver system that is readily adapted for converting existing monochromatic receivers into polychromatic receivers.

Another object of the present invention is to provide a new and improved color television receiver in which a single gun cathode ray tube is converted to a polychromatic tube by placing an optical filter on the exterior face of the tube.

Another object of the invention is to provide a mask adapted to be placed on the face of a single gun cathode ray tube for enabling the tube to be converted into a color image producer.

A further object of the invention is to provide a color adapter for monochrome television receivers wherein the adapter automatically enables the receiver to be utilized for black and white reception.

The above and still further objects, features and advantages of the present invention will become apparent upon consideration of the following detailed description of one specific embodiment thereof, especially when taken in conjunction with the accompanying drawing, wherein.

Figures 1, 2, 3, 4, 5:
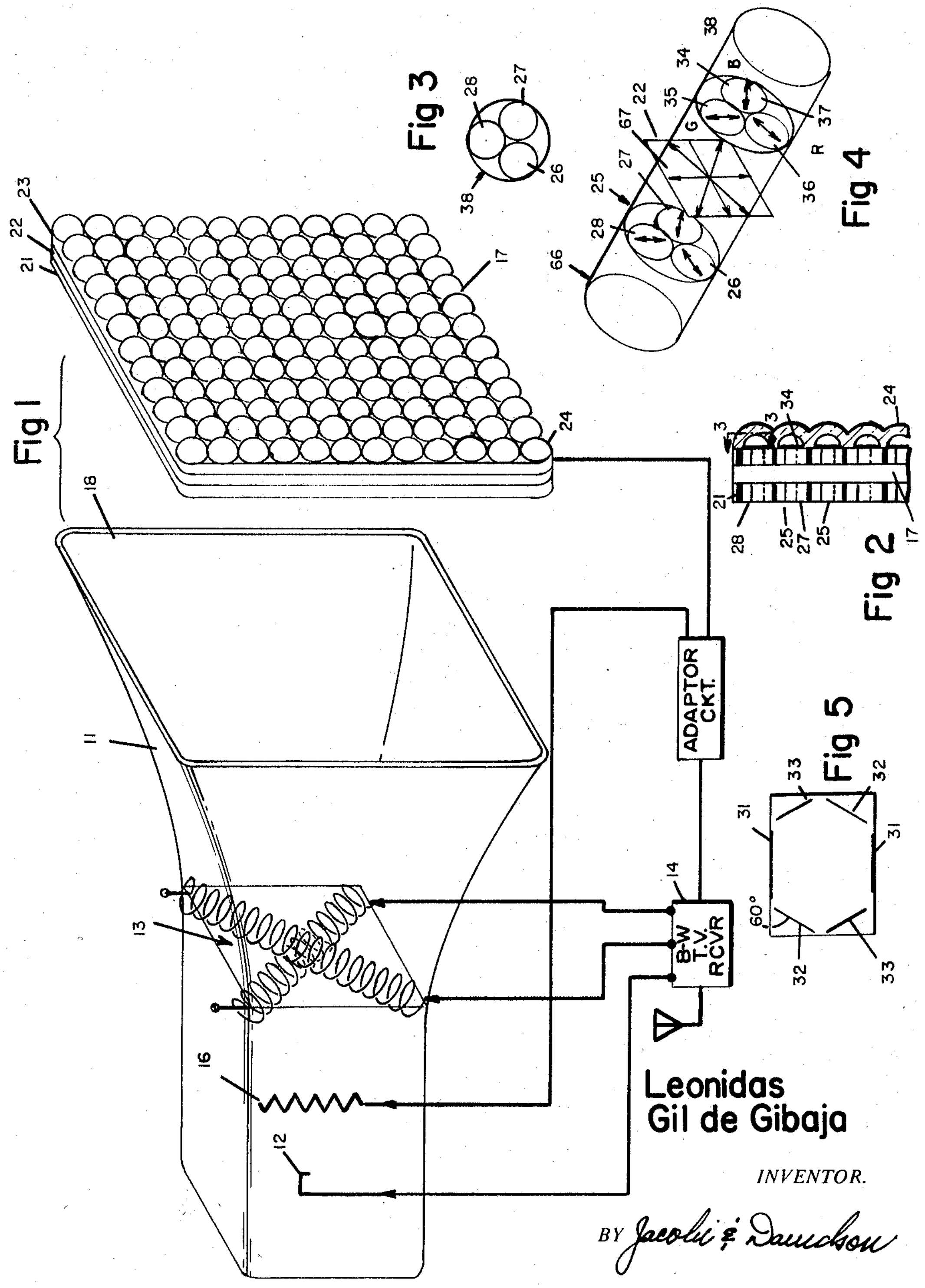
FIGURE 1 is a schematic and perspective view illustrating the color adapter of the present invention, in combination with a conventional black and white television receiver.
FIGURE 2 is a side sectional view, in detail, of the optical system for converting monochromatic television images to polychromatic images.
FIGURE 3 is a front view of one color converting segment, as taken through the lines 3—3 of FIGURE 2.
FIGURE 4 is a perspective view of one color converting segment.
FIGURE 5 is a front view of the electrodes for driving the Kerr cell.

Reference is now made particularly to FIGURES 1–5, wherein single gun cathode ray tube 11 of the type usually found in black and white television receivers is provided. Cathode 12 and deflection coils 13 are driven in the usual manner by black and white television receiver circuit 14. The video output of receiver 14 is applied to circuit 15 that drives control grid 16 of CRT11 and color image transformation system 17 that is easily mounted on face 18 of CRT 11.

System 17, for transforming the monochromatic image on face 18 into a polychromatic image, comprises four stacked layers 21–24, having a total thickness on the order of one-half inch. Layer 21, urged against the face of CRT11, comprises approximately 331,000 generally circular segments 25 that are orthogonally arranged, wherein the edges of adjacent segments are in contact. Each of segments 25 is of approximately the same area as the cathode ray beam focused on face 18. Each segment 25 is divided into three equally sized, circular polarizing portions 26, 27 and 28 in which portions 26 and 27 form the base of a triangle and portion 28 its apex. The polarization directions of portions 26–28 are rotated 120° relative to each other so that only vertically polarized light passes through portion 28 while light polarized ±120° relative to vertical is transmitted through portions 26 and 27.

Pressed against the surface of layer 21 remote from face 18 is layer 22 that comprises a rectangular glass container having a material therein that becomes in essence a uniaxial crystal in response to a potential being applied thereto. Such an electro-optical filter is the well-known Kerr cell. Kerr cell 22 includes three pairs of parallel, insulated electrodes 31–33, each of which is displaced from its adjacent electrode by approximately 60°, as most clearly seen in FIGURE 5. In response to voltage of the proper amplitude being applied across any single pair of electrode 31–33, Kerr cell 22 becomes a uniaxial crystal that passes substantial light only in a direction at right angles to the activated electrodes. Thus, if voltage is applied between electrodes 31, the material in Kerr cell 22 becomes polarized at right angles to electrodes 31. In contrast, establishment of a potential distribution between electrodes 32 or 33 results in Kerr cell 22 passing light polarized at ±120° relative to the polarization direction when electrodes 31 are activated. If no potential is applied to any of electrodes 31–33, Kerr cell 22 is transparent to pass all light.

In contact with Kerr cell 22 is an additional polarizing layer 23, having the same number of circular polarizing segments 34 as included in layer 21. Each of segments 34 includes three polarizing portions 35–37, having their polarizing directions displaced from each other by 120°. Each of segments 25 and 34 is aligned as are their corresponding polarizing portions. Segments 25 and 34 differ from each other, however, in that portions 35, 36 and 37 of the latter are respectively provided with green, red and blue color filters.

Layer 24, urged against the face of polarizing sheet 23, comprises a multiplicity of pressed spherical lenses 38, equal in number to and aligned with circular segments 25 and 34. The size of each lens 38, hence segments 25 and 34, is determined by the actual size of the maximum resolution obtainable with picture tube 11 so that concentration and magnification of the polychromatic light deriving from the lenses is attained.

Figure 6:
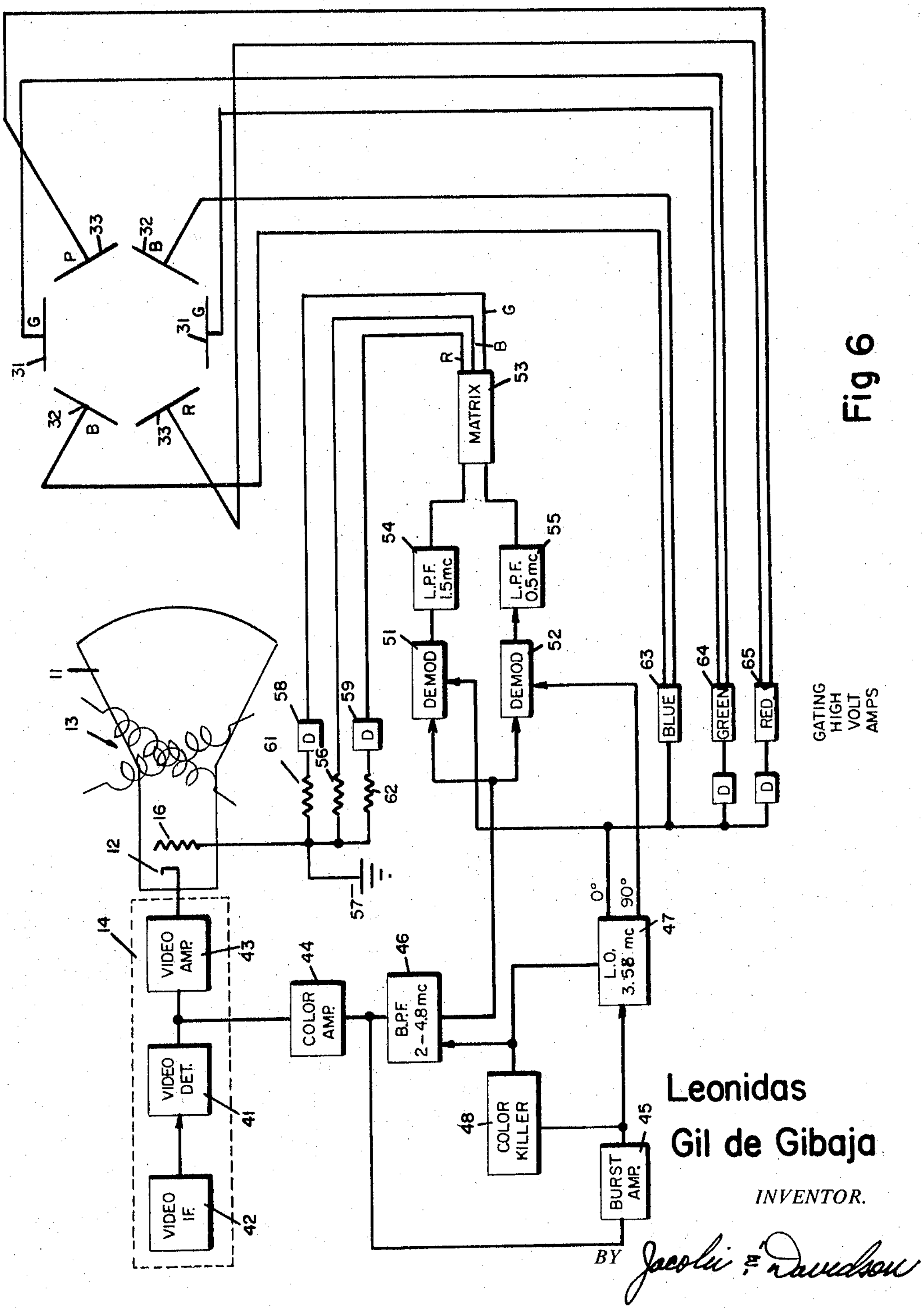
FIGURE 6 is a schematic, block diagram of the adapter circuitry utilized with the present invention.
Figure 6:
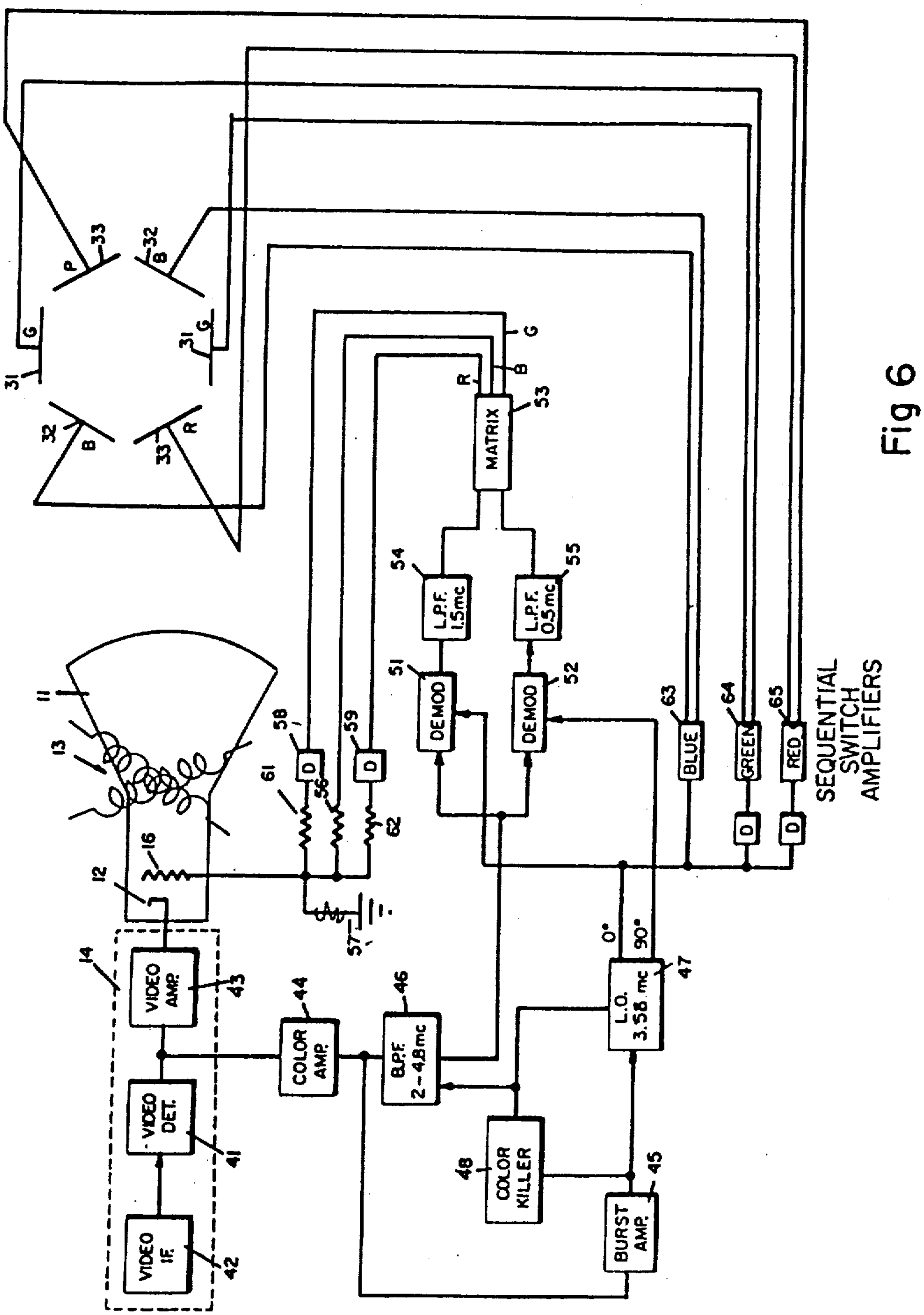

Reference is now made to the circuit diagram of FIGURE 6 in which a segment of receiver chassis 14, responsive to either a monochromatic or polychromatic National Broadcasting signal, is shown as including video detector 41, fed by I.F. amplifier 42. The output of detector 41 feeds cathode 12 of CRT11, via video amplifier 43, in parallel with color adapter circuit 15.

Adapter circuit 15 comprises color amplifier 44, of substantially the same construction as video amplifier 43. The signal deriving from amplifier 44 is fed in parallel to color burst amplifier 45 and band pass amplifier 46 that passes signals in the 2–4.8 megacycle range. The output signal of amplifier 45 phase locks 3.58 megacycle local oscillator 47, having a pair of outputs phase displaced from each other by 90°. In addition, the output of amplifier 45 activates color killer circuit 48 that supplies off gating voltages to amplifier 46 and oscillator 47 when no color bursts are derived from amplifier 45 for a predetermined time interval, on the order of $\frac{1}{30}$ second.

The two phase outputs of oscillator 47 and the signal deriving from amplifier 46 are combined in demodulators 51 and 52. The outputs of demodulators 51 and 52 are applied to addition matrix 53 via low pass filters 54 and 55 to derive red, green and blue chrominance indicating signals, in a manner well known to the color television art. The blue output deriving from matrix 53 is applied to control grid 16 via summing resistor 56 and load resistor 57. In contrast, the green and red matrix outputs are respectively supplied to grid 16 via summing resistors 58 and 59, as well as delay circuits 61 and 62. The green and red signals are respectively delayed by approximately $\frac{1}{30}$ and $\frac{2}{30}$ of a microsecond, assuming the cathode ray beam impinges upon each segment 34 for approximately 0.1 microsecond.

The zero phase output of local oscillator 47 is supplied to gating, high voltage amplifiers 63–65, the latter two being connected via $\frac{1}{30}$ and $\frac{2}{30}$ microsecond delay lines 66 and 67. Each of amplifiers 63–65 generates a high voltage output, of square or saw tooth wave form, when its input crosses zero in a positive direction. The duration of each output wave is approximately $\frac{1}{30}$ microsecond so that no overlap between wave occurrences develops. The outputs of amplifiers 63–65 are respectively applied to electrodes 31–33 with sufficient amplitude to cause activation of Kerr cell 22 into a birefringent state where it functions as a uniaxial crystal.

To describe the manner by which the present invention functions, reference is made to FIGURES 4 and 6. Assume for purposes of illustration, that the swept cathode ray beam of CRT11 is stationary so that light spot 66 derives from face 18. The light intensity of spot 66, which is circular and of approximately the same size as segments 25 and 34 as well as lens 24, is controlled at any instant by the luminance or brightness information supplied by amplifier 43 to cathode 12 and the color information supplied to grid 16 by the outputs of matrix 53. The blue, green and red color information is applied in sequence to grid 16 synchronously with activation of electrodes 31, 32 and 33.

During the first third ($\frac{1}{30}$ microsecond) of the time interval that spot 66 covers segment 25, electrodes 33 of Kerr cell 22 are activated, causing the cell to be a uniaxial crystal in the direction indicated by line 67. Thereby, the polarization directions of portions 26 and 36 are aligned with the polarization direction of cell 22 and red light is transmitted to lens 38. Lens 24 is arranged so that the light deriving from portion 36 appears to cover and derive from the total area of the lens. The red light intensity is determined by the red amplitude derived from matrix 53 at the beginning of each cycle of local oscillator 47 and the video signal amplitude deriving from amplifier 43.

During the next $\frac{1}{30}$ microsecond, the voltage between electrodes 33 is extinguished and electrodes 31 are activated, causing Kerr cell 22 to be a uniaxial polarizer in the direction indicated by line 68. Simultaneously, the light intensity of spot 66 is varied to correspond with the green chrominance information deriving from matrix 53 and delay line 58. Because the polarization directions of electro-optical cell 22 and polarizing filters 28 and 35 are aligned, green light is now derived from lens 38. There are no red components now derived from lens 24 because the Kerr cell does not pass light polarized in the direction of line 67 and polarizers 26 and 36. Similarly, during the next $\frac{1}{30}$ microsecond, electrodes 33 are activated and grid 16 is supplied with red chrominance information so that only red light is derived from lens 38.

As the cathode ray beam proceeds across CRT face 18, each of lenses 38 is successively supplied with blue, green and red light that is effectively gated to it by polarizing sheets 21 and 23 as well as Kerr cell 22. The red, green and blue colors are mixed by the eye in response to the successively modulated colors derived from lenses 38. Because the red, green and blue lights all derive from substantially the same area, one of lenses 38, during each 0.1 microsecond interval, the eye mixes them together to form the various hues. In this manner, a complete color image is formed on the exterior face of layer 24.

When monochromatic signal is applied to the receiver, color killer 48 is activated so that no activating voltages are applied to electrodes 31–33 and the potential of grid 16 remains constant. In consequence, the black and white information applied to the CRT face 18 is simultaneously passed through each of color filters 35–37. The red, green and blue light deriving from filters 35–37 is combined in the same area on lens 38 to derive black and white information.

While I have described and illustrated one specific embodiment of my invention, it will be clear that variations of the details of construction which are specifically illustrated and described may be resorted to without departing from the true spirit and scope of the invention as defined in the appended claims. For example, it is possible to form each of segments 25 and 34, as well as lens 38, as a square, or regular hexagon. Also, Kerr cell 22 may take the form of the well known wire mesh condenser in lieu of the specifically illustrated parallel plate condenser.

I claim:

1. A mask for enabling a single gun cathode ray tube to produce color images comprising a polarizing sheet containing a multiplicity of segments, adjacent ones of said segments being in contact, said segments being divided into three portions for passing light polarized in three different directions, the area of each of said segments being approximately equal to the area of the cathode ray of said tube, said polarizing sheet adapted to be attached to the face of said tube, an electro-optical shutter responsive to light deriving from said polarizing sheet, said shutter including means for passing light polarized in each of sad three directions, but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light.

2. A mask for enabling a single gun cathode ray tube to produce color images comprising a polarizing sheet containing a multiplicity of segments, adjacent ones of said segments being in contact, said segments being divided into three portions for passing light polarized in three different directions, the area of each of said segments being approximately equal to the area of the cathode ray of said tube, said polarizing sheet adapted to be attached to the face of said tube, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light, a sheet containing a multiplicity of lenses responsive to light deriving from said light filter, each of said lenses and said segments being approximately the same area and aligned, said lenses magnifying the image deriving from each of said portions to an area substantially equal to said segments.

3. A mask for enabling a single gun cathode ray tube to produce color images comprising a polarizing sheet containing a multiplicity of segments, adjacent ones of said segments being in contact, said segments being divided into three portions for passing light polarized in three different directions, the area of each of said segments being approximately equal to the area of the cathode ray of said tube, said polarizing sheet adapted to be attached to the face of said tube, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light and for passing light polarized in said three directions, the light polarizers of said filter and said polarizing sheet in the same direction being aligned.

4. A mask for enabling a single gun cathode ray tube to produce color images comprising a polarizing sheet containing a multiplicity of segments, adjacent ones of said segments being in contact, said segments being divided into three portions for passing light polarized in three different directions, the area of each of said segments being approximately equal to the area of the cathode ray of said tube, said polarizing sheet adapted to be attached to the face of said tube, an electro-optical shutter responsive to light deriving from said polarizing sheet, said shutter including means for passing light polarizing in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light and for passing light polarized in said three directions, the light polarizers of said filter and said polarizing sheet in the same direction being aligned, a sheet containing a multiplicity of lenses responsive to light deriving from said light filter, each of said lenses and said segments being approximately the same area and aligned, said lenses magnifying the image deriving from each of said portions to an area substantially equal to said segments.

5. A color television image forming system comprising a cathode ray tube having a single gun, a target responsive to the electron beam deriving from said gun for emitting light in response to impingement of said beam thereon, a polarizing sheet responsive to light deriving from said target, said polarizing sheet containing a multiplicity of segments, adjacent ones of said segments being in contact, said segments being divided into three portions for passing light polarized in three different directions, the area of each of said segments being approximately equal to the area of the cathode ray, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light.

6. A color television image forming system comprising a cathode ray tube having a single gun, a target responsive to the electron beam deriving from said gun for emitting light in response to impingement of said beam thereon, a polarizing sheet responsive to light deriving from said target, said polarizing sheet containing a multiplicity of segments, adjacent ones of said segments being in contact, said segments being divided into three portions for passing light polarized in three different directions, the area of each of said segments being approximately equal to the area of the cathode ray, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light, a sheet containing a multiplicity of lenses responsive to light deriving from said light filter, each of said lenses and said segments being approximately the same area and aligned, said lenses magnifying the image deriving from each of said portions to an area substantially equal to said segments.

7. A color television image forming system comprising a cathode ray tube having a single gun, a target responsive to the electron beam deriving from said gun for emitting light in response to impingement of said beam thereon, a polarizing sheet responsive to light deriving from said target, said polarizing sheet containing a multiplicity of segments, adjacent ones of said segments being in contact, said segments being divided into three portions for passing light polarized in three different directions, the area of each of said segments being approximately equal to the area of the cathode ray, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light and for passing light polarized in said three directions, the light polarizers of said filter and said polarizing sheet in the same direction being aligned.

8. A color television image forming system comprising a cathode ray tube having a single gun, a target responsive to the electron beam deriving from said gun for emitting light in response to impingement of said beam thereon, a polarizing sheet responsive to light deriving from said target, said polarizing sheet containing a multiplicity of segments, adjacent ones of said segments being in contact, said segments being divided into three portions for passing light polarized in three different directions, the area of each of said segments being approximately equal to the area of the cathode ray, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light and for passing light polarized in said three directions, the light polarizes of said filter and said polarizing sheet in the same direction being aligned and for passing light polarized in said three directions, the light polarizers of said filter and said polarizing sheet in the same direction being aligned, a sheet containing a multiplicity of lenses responsive to light deriving from said light filter, each of said lenses and said segments being approximately the same area and aligned, said lenses magnifying the image deriving from each of said portions to an area substantially equal to said segments.

9. A color television receiver responsive to a signal transmitted in accordance with national broadcast standards comprising a single gun cathode ray tube, a polarizing sheet responsive to light deriving from the face of said tube, said polarizing sheet containing a multiplicity of segments, adjacent ones of said segments being in contact, said segments being divided into three portions for passing light polarized in three different directions, the area of each of said segments being approximately equal to the area of the cathode ray of said tube, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light, means responsive to said signal for sequentially activating said electro-optical shutter to pass light polarized in said three directions, said shutter being activated in one of said directions for a time only a portion of the time light from the cathode ray beam impinges on one of said segments, and means responsive to said signal for sequentially modulating the cathode ray beam in accordance with red, green and blue chrominance information in said signal, the period of ray modulation for each color being synchronized with activation of said shutter.

10. A color television receiver responsive to a signal transmitted in accordance with national broadcast standards comprising a single gun cathode ray tube, a polarizing sheet responsive to light deriving from the face of said tube, said polarizing sheet containing a multiplicity of segments, adjacent ones of said segments being on contact, said segments being divided into three portions for passing passing light polarized in three different directions, the area of each of said segments being approximately equal to the area of the cathode ray of said tube, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light, a sheet containing a multiplicity of lenses responsive to light deriving from said light filter, each of said lenses and said segments being approximately the same area and aligned, said lenses magnifying the image deriving from each of said portions to an area substantially equal to said segments, means responsive to said signal for sequentially activating said electro-optical shutter to pass light polarized in said three directions, said shutter being activated in one of said directions for a time only a portion of the time light from the cathode ray beam impinges on one of said segments, and means responsive to said signal for sequentially modulating the cathode ray beam in accordance with red, green and blue chrominance information in said signal, the period of ray modulation for each color being synchronized with activation of said shutter.

11. The receiver of claim 10 further including means responsive to said signal for disabling activation of said shutter when no color information is received.

12. A color television receiver responsive to a signal transmitted in accordance with national broadcast standards comprising a single gun cathode ray tube, a polarizing sheet responsive to light deriving from the face of said tube, said polarizing sheet containing a multiplicity of segments, adjacent ones of said segments being in contact, said segments being divided into three portions for passing light polarized in three different directions, the area of each of said segments being approximately equal to the area of the cathode ray of said tube, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light and for passing light polarized in said three directions, the light polarizers of said filter and said polarizing sheet in the same direction being aligned, means responsive to said signal for sequentially activating said electro-optical shutter to pass light polarized in said three directions, said shutter being activated in one of said directions for a time only a portion of the time light from the cathode ray beam impinges on one of said segments, and means responsive to said signal for sequentially modulating the cathode ray beam in accordance with red, green and blue chrominance information in said signal, the period of ray modulation for each color being synchronized with activation of said shutter.

13. A color television receiver responsive to a signal transmitted in accordance with national broadcast standards comprising a single gun cathode ray tube, a polarizing sheet responsve to light deriving from the face of said tube, said polarizing sheet containing a multiplicity of segments, adjacent ones of said segments being in contact, said segments being divided into three portions for passing light polarized in three different directions, the area of each of said segments being approximately equal to the area of the cathode ray of said tube, an electro-optical shutter responsive to light deriving from said polarizing sheet, said shutter including means for passing light polarized in each of said three directions but in only one direction at a time, a light filter containing a multiplicity of segments, the segments of said light filter and polarizing sheet being approximately the same area and aligned, each of the segments of said light filter being divided into three portions aligned with corresponding portions of said polarizing sheet, the three portions of each segment having color filters for respectively passing red, green and blue light, a sheet containing a multiplicity of lenses responsive to light deriving from said light filter, each of said lenses and said segments being approximately the same area and aligned, said lenses magnifying the image deriving from each of said portions to an area substantially equal to said segments and for passing light polarized in said three directions, the light polarizers of said filter and said polarizing sheet in the same direction being aligned, means responsive to said signal for sequentially activating said electro-optical shutter to pass light polarized in said three directions, said shutter being activated in one of said directions for a time only a portion of the time light from the cathode ray beam impinges on one of said segments, and means responsive to said signal for sequentially modulating the cathode ray beam in accordance with red, green and blue chominance information in said signal, the period of ray modulation for each color being synchronized with activation of said shutter.

References Cited by the Examiner

UNITED STATES PATENTS

| | | | |
|---|---|---|---|
| 2,169,838 | 6/1942 | Herbst | 88—61 |
| 2,705,903 | 4/1955 | Marshall | 178—5.4 X |

DAVID G. REDINBAUGH, *Primary Examiner.*

J. A. O'BRIEN, *Assistant Examiner.*

UNITED STATES PATENT AND TRADEMARK OFFICE

CERTIFICATE OF CORRECTION

PATENT NO. : 3,299,203

DATED : January 17, 1967

INVENTOR(S) : Leonidas Gil de Gibaja

It is certified that error appears in the above-identified patent and that said Letters Patent is hereby corrected as shown below:

Figure 6 should appear as shown on the attached sheet.

Column 1, line 3, "VALUES" should read -- VALVES--.

Column 2, after line 22, insert -- Yet a further object of the invention is to provide a novel image forming system, including a multiplicity of light valves.--

Column 2, line 29, after "adapter" insert -- and image forming mask --.

Column 2, line 38, "segment;" should read -- segment, polarized light valves --.

Column 2, line 40, after "and" insert -- image forming light valves --.

Signed and Sealed this

*Twentieth* Day of *March 1984*

[SEAL]

*Attest:*

GERALD J. MOSSINGHOFF

*Attesting Officer* *Commissioner of Patents and Trademarks*